United States Patent [19]

Hambrecht et al.

[11] Patent Number: 4,526,927
[45] Date of Patent: Jul. 2, 1985

[54] THERMOPLASTIC MOLDING MATERIALS

[75] Inventors: Juergen Hambrecht, Heidelberg; Franz Brandstetter, Neustadt; Walter Ziegler, Edingen-Neckarhausen; Wolfgang F. Müller, Neustadt; Klaus Bronstert, Carlsberg; Adolf Echte, Ludwigshafen, all of Fed. Rep. of Germany

[73] Assignee: BASF Aktiengesellschaft, Fed. Rep. of Germany

[21] Appl. No.: 509,761

[22] Filed: Jun. 30, 1983

[30] Foreign Application Priority Data

Jul. 15, 1982 [DE] Fed. Rep. of Germany ....... 3226427

[51] Int. Cl.$^3$ ............................................. C08L 61/04
[52] U.S. Cl. ...................................... 525/68; 525/71; 525/74; 525/80; 525/82; 525/92; 525/94; 525/97; 525/141; 525/143; 525/271; 525/285; 525/286; 525/302; 525/905
[58] Field of Search ....................... 525/68, 71, 74, 80, 525/92, 94, 97, 141, 143, 271, 285, 286, 302, 905

[56] References Cited

U.S. PATENT DOCUMENTS

| | | | |
|---|---|---|---|
| 3,383,435 | 5/1968 | Ciz | 260/874 |
| 4,128,602 | 12/1978 | Katchman et al. | 260/876 R |
| 4,128,603 | 12/1978 | Katchman et al. | 260/876 R |
| 4,252,913 | 2/1981 | Katchman et al. | 525/92 |
| 4,389,511 | 6/1983 | Cooper et al. | 525/92 |

FOREIGN PATENT DOCUMENTS

| | | |
|---|---|---|
| 1932234 | of 0000 | Fed. Rep. of Germany . |
| 2434848 | of 0000 | Fed. Rep. of Germany . |
| 2713509 | of 0000 | Fed. Rep. of Germany . |
| 2750515 | of 0000 | Fed. Rep. of Germany . |
| 3038551 | of 0000 | Fed. Rep. of Germany . |
| 40350 | 3/1983 | Japan ................. 525/92 |

Primary Examiner—Jacob Ziegler
Attorney, Agent, or Firm—Keil & Weinkauf

[57] ABSTRACT

A thermoplastic molding material contains a styrene polymer, a polyphenylene ether and, as a component for improving the impact strength, a block copolymer obtained by reacting an ethylene copolymer with an active polymeric anion.

2 Claims, No Drawings

THERMOPLASTIC MOLDING MATERIALS

The present invention relates to thermoplastic molding materials based on styrene polymers, polyphenylene ethers and a component for improving the impact strength.

Thermoplastic materials suitable for the production of moldings and containing styrene polymers and polyphenylene ethers have been disclosed in, for example, U.S. Pat. Nos. 3,383,435, 4,128,602 and 4,128,603. Such materials are useful for the production of moldings which possess better heat distortion-resistance than impact-resistant styrene polymers which do not contain polyphenylene ethers. The physical properties of such molding materials are in general satisfactory, but it has been found that the impact strength of moldings is sometimes inadequate.

Various proposals have therefore been made with regard to increasing the impact strength by adding elastomeric block copolymers. For example, German Published Application DAS No. 1,932,234 and German Laid-Open Applications DOS No. 2,434,848, DOS No. 2,713,509, DOS No. 2,750,515 and DOS No. 3,038,551 describe molding materials comprising styrene polymers, polyphenylene ethers and, as additives, hydrogenated and/or non-hydrogenated block copolymers which have various compositions and mainly consist of polymerized vinyl-aromatic hydrocarbon blocks and polymerized conjugated diene polymer blocks. These molding materials possess improved impact strength. However, all these mixtures have in common that the addition of the elastomeric block copolymers and polyolefin resins leads to a reduction in the heat distortion-resistance, and the increase in the impact strength is not sufficient in every case.

It is an object of the present invention to provide thermoplastic molding materials which are based on styrene polymers and polyphenylene ethers, and can be processed to give moldings which have improved impact strength while retaining high heat distortion-resistance.

We have found that this object is achieved, in accordance with the invention, by molding materials based on (a) styrene polymers, (b) polyphenylene ethers and (c) a component which improves the impact strength, wherein component (c) is a block copolymer obtained when a copolymer of ethylene with an acrylate-, methacrylate-, halogen-, anhydride- or epoxide-containing monomer or carbon monoxide is reacted with an active polymeric anion comprising one or more anionically polymerized monomers.

For the purposes of the present invention, molding materials are non-molded mixtures which can be converted to moldings or semi-finished products by thermoplastic processing within a particular temperature range. The molding materials may be in the form of granules, powders, tablets, sheets or webs.

The thermoplastic molding materials can contain modified or non-modified styrene polymers and polyphenylene ethers in any desired amounts, for example from 5 to 90% by weight of styrene polymers and from 95 to 10% by weight of polyphenylene ethers. Particularly suitable materials for the production of moldings are those containing from 20 to 80% by weight of styrene polymers and from 80 to 20% by weight of polyphenylene ethers. The novel molding materials furthermore contain from 3 to 30, preferably from 5 to 20, parts by weight, based on the total mixture of components (a), (b) and (c), of a component (c) which improves the impact strength and is a block copolymer of the above type.

Component (a) can be a non-modified styrene polymer and/or an impact-resistant styrene polymer. The non-modified styrene polymers present in the thermoplastic molding material can be prepared by any desired method, for example as described in H. Ohlinger, Polystyrol Teil I, Herstellverfahren und Eigenschaften der Produkte, Springer-Verlag, Berlin, Göttingen, Heidelberg, 1955, or in S. R. Sandler and W. Karo, Polymer Synthesis, Organic Chemistry, Vol. 29—I, Academic Press, New York, 1974. Styrene polymers having molecular weights Mw of from 50,000 to 500,000 are preferred.

The impact-resistant styrene polymers present in the molding material can be prepared by any desired process, provided care is taken to ensure that the mean particle size is from 0.6 to 4 $\mu$m. It is also possible to combine impact-resistant styrene polymers whose soft components have different particle sizes. For example, it is possible to use 90 parts by weight of a polymer having a mean particle size of 0.6 $\mu$m and 10 parts by weight of a polymer having a mean particle size of 6 $\mu$m. Particularly suitable thermoplastic molding materials are those in which the mean particle size is from 0.6 to 4 $\mu$m, and from 99 to 85% by weight of the particles have a diameter of from 0.3 to 0.9 $\mu$m and from 1 to 20% by weight of the particles have a diameter of from 3 to 7 $\mu$m.

Impact-resistant styrene polymers are most commonly prepared by mass polymerization or solution polymerization, as described in, for example, U.S. Pat. No. 2,694,692, or by mass-suspension polymerization, as described in, for example, U.S. Pat. No. 2,862,906. It is of course also possible to use other processes, provided these give the above particle size combination.

A particularly suitable monovinyl-aromatic compound is styrene, and styrenes which are alkyl-substituted in the nucleus or in the side chain may also be employed. Preferably, however, styrene is used alone.

The rubbers employed are the natural or synthetic rubbers conventionally used for imparting impact resistance to styrene polymers. For the purposes of the present invention, examples of suitable rubbers, in addition to natural rubber, are polybutadiene, polyisoprene and copolymers of butadiene and/or isoprene with styrene and other comonomers, which have a glass temperature below −20° C. Butadiene polymers with a 1,4-cis content of from 25 to 98% are particularly suitable, but acrylate rubbers, EPDM (ethylene-propylene non-conjugated diene) rubbers, polybutylene rubbers and polyoctenamer rubbers may also be employed.

The polyphenylene ethers of component (b) are compounds based on polyphenylene oxides disubstituted in the ortho position, the ether oxygen of one unit being bonded to the benzene nucleus of the adjacent unit, not less than 50 units being linked together in this way. In the ortho-position to the oxygen, the polyphenylene ethers can have hydrogen, halogen, a hydrocarbon radical which does not possess an $\alpha$ tertiary hydrogen atom, a halohydrocarbon radical, a phenyl radical or a hydrocarbonoxy radical. Examples of suitable compounds are poly(2,6-dichloro-1,4-phenylene) ether, poly(2,6-diphenyl-1,4-phenylene) ether, poly(2,6-dimethoxy-1,4-phenylene) ether, poly(2,6-dimethyl-1,4-phenylene) ether and poly(2,6-dibromo-1,4-phenylene)

ether, but poly(2,6-dimethyl-1,4-phenylene) ether is preferably employed. A very particularly preferred compound is poly(2,6-dimethyl-1,4-phenylene) ether having an intrinsic viscosity of from 0.40 to 0.66 dl/g, measured in chloroform at 30° C.

Component (c) which improves the impact strength of the novel molding material is a block copolymer obtained when an ethylene copolymer of the general formula $$[(A_n)_i(B_1)_k]$$

is reacted with an active polymeric anion obtained from ethylenically unsaturated, anionically polymerizable monomers.

The ethylene copolymers of the above general formula which are to be used in this case possess, as functional groups, one or more acrylate groups, methacrylate groups, halogen atoms, carboxylic anhydride groups or epoxide groups, or contain carbon monoxide as a comonomer, and are known per se (cf., for example, Houben-Weyl, Methoden der organischen Chemie, Volume 14/1, 1961, pages 619–621, Verlag Georg Thieme, Stuttgart, or Renfrew & Morgan, Polyethylene, 1960, pages 345–369, Iliffe & Sons Ltd., publishers, London). The ethylene copolymers can be prepared by a conventional process in an autoclave and/or a tubular polymerization apparatus, under a pressure of from 200 to 5,000 bar and at from 50° to 450° C., in the presence of a free-radical polymerization initiator (cf. Ullmanns Encyklopädie der technischen Chemie, 19 (1980), 167–226). Comonomers which can be used with ethylene include alkyl acrylates and methacrylates, carbon monoxide, vinyl chloride, maleic anhydride, vinyl glycidyl ether, glycidyl acrylate, glycidyl methacrylate and vinylcyclohexanone monoxide.

The ethylene copolymers have densities of from 0.910 to 0.965, in particular from 0.915 to 0.960, g/cm³, and melt indices of above 0.1 g/10 min., measured at 190° C. and 2.16 kp load. In the general formula $$[(A_n)_i(B_1)_k]$$

A is —CH$_2$—CH$_2$—, B is the comonomer which possesses one of the functional groups described above and is present as copolymerized units, n is an integer greater than 30, 1, i and k are each an integer greater than or equal to 1, and k.1≧i. n and 1 correspond to the degree of polymerization, and i and k are the number of blocks in the copolymer.

Particularly suitable for the preparation of the novel block copolymers of component (c) are copolymers of ethylene with acrylates or methacrylates, e.g. methyl, n-butyl, tert.-butyl or ethylhexyl acrylate or methyl methacrylate, or with maleic anhydride or carbon monoxide.

The ethylene copolymers described above are preferably reacted, in the absence of air and moisture, with active polymeric anions C$_m$ obtained from ethylenically unsaturated, anionically polymerizable monomers.

Component (c) is therefore a block copolymer of the general formula $[(A_n):(B_1)_k(C_m)_j]$, where A is CH$_2$—CH$_2$—, B is an acrylate or methacrylate or a halogenanhydride- or epoxide-containing monomer, or carbon monoxide, C$_m$ is obtained from one or more monomers, n and m are each integers greater than 30, 1, i, k and j are each integers greater than or equal to 1, and k.1≧j.

For the purposes of the present invention, active polymeric anions are polymers in which the chain ends are still capable of further adduct formation with monomers or polymers (cf. G. Henrici-Olive, Polymerisation, Verlag Chemie, Weinheim (1969)). The active polymeric anions are prepared from the ethylenically unsaturated, anionically polymerizable monomers in a conventional manner by polymerization of the monomers in solution in the presence of a monolithium-hydrocarbon as an initiator. Suitable monomers for this process are all anionically polymerizable compounds as described in, inter alia, Polymer Chemistry by B. Vollmert, Springer-Verlag, Berlin, Heidelberg, New York (1973), pages 44–47. Styrene, butadiene and isoprene, as well as mixtures of these, are preferred. Either a single anionically polymerizable monomer or a number of different monomers may be employed. Depending on the polymerization process used, the above monomers give copolymers having a more or less statistical distribution of the monomers along the polymer chain; where only a single monomer is used, pure homopolymers are obtained. The polymers obtained from the anionically polymerizable monomers are products of the C$_m$ type, where C is one or more anionically polymerizable monomers and m is the degree of polymerization and is greater than 30.

Particularly preferred block copolymers are those of the above type, in which n is from 200 to 8,000, m is from 100 to 4,000, 1 is from 1 to 1,500, i is from 1 to 5, k is from 1 to 20 and j is from 1 to 20.

The reaction of the ethylene copolymer with the active polymer comprising one or more anionically polymerized monomers is carried out in general in solution. Particularly suitable solvents are tetrahydrofuran and aromatic hydrocarbons which are liquid at room temperature, e.g. benzene, xylene, toluene and ethylbenzene. It is convenient, but not essential, to use the appropriate solvent at the stage of the preparation of the active polymer from the anionically polymerizable monomers. A solution of the active polymer (C$_m$) can be added to a solution of the ethylene copolymer [(A$_n$-)$_i$(B$_1$)$_k$], or the latter solution can be added to the former, the addition taking place under nitrogen, in the absence of moisture and while stirring at from 0° to 130° C., preferably from 20° to 100° C. The reaction is in general complete after a few minutes, the maximum time required being 120 minutes. The resulting block copolymer can be used in solution or can be first worked up in a separate step, e.g. precipitation, evaporating down or direct devolatilization.

The mixtures of the styrene polymers, the polyphenylene ethers and the elastomeric block copolymers of component (c) may furthermore contain further additives, e.g. pigments, dyes, fillers, flame-retarding agents, other compatible polymers, antistatic agents, antioxidants and lubricants.

The novel thermoplastic molding materials are prepared in a conventional manner in an apparatus which permits homogeneous mixing, e.g. a kneader, an extruder or a roll mill.

The novel molding materials possess, in addition to high heat distortion-resistance, a high notched impact strength, high viscosity in the gravity tube test, good flow and excellent surface properties.

The Examples which follow illustrate the invention without being intended to restrict it. Parts are by weight, unless stated otherwise.

The intrinsic viscosity of the polyphenylene ether was measured on a 0.5% strength solution in chloroform at 30° C.

The energy at break was measured in accordance with DIN 53,443, Sheet 1, at 23° C., and the notched impact strength was measured in accordance with DIN 53,433, at 23° C.

The flow was determined from the melt index according to DIN 53,735, at 250° C., and the heat distortion-resistance was obtained from the Vicat softening point, according to DIN 53,460/B.

EXAMPLES AND COMPARATIVE EXAMPLES

I. Preparation of the styrene polymers (a)

($a_1$) A polystyrene having a molecular weight of 220,000 (measured in benzene at 25° C. by viscometry) was obtained by thermal polymerization, by the method described in S. R. Sandler and W. Karo, Polymer Synthesis, Organic Chemistry, Vol. 29—I, Academic Press, New York, 1974, page 8.

($a_2$) Preparation of an impact-resistant polystyrene having a mean particle size of 0.5 μm:

A solution comprising 1,560 g of styrene, 240 g of a butadiene/styrene block copolymer having an indefinite transition between the blocks (intrinsic viscosity = 1.74 dl/g, measured in toluene at 25° C.; 31.0% of block polystyrene, intrinsic viscosity = 0.364 dl/g, measured in toluene at 25° C.; total styrene content = 41.6%), 1.6 g of t-dodecylmercaptan, 2.2 g of octadecyl 3-(3',5'-di-tert.-butyl-4-hydroxyphenyl)-propionate and 1.7 g of dicumyl peroxide was prepolymerized in a 5 liter stirred kettle equipped with a paddle stirrer, the internal temperature being 110° C., the stirrer being operated at 150 r.p.m., and polymerization being continued until the solids content was 43.8% by weight.

1,800 ml of water, containing 9.0 g of polyvinylpyrrolidone having a K value of 90 and 1.8 g of $Na_4P_2O_7$, ere then added, and the speed of the stirrer was increased to 300 r.p.m. Polymerization was then continued for 5 hours at 120° C. and for 5 hours at 140° C., a styrene conversion of 99% being achieved.

($a_3$) Preparation of an impact-resistant polystyrene having a mean particle size of about 6 μm:

A solution comprising 1,283 g of styrene, 112 g of polybutadiene (1,2-vinyl content about 9% by weight), 1.5 g of tert.-dodecylmercaptan, 1.5 g of octadecyl 3-(3',5'-di-tert.-butyl-4'-hydroxyphenyl)-propionate and 1.5 g of dicumyl peroxide was prepolymerized in a 4 liter stirred kettle equipped with a paddle stirrer, the internal temperature being 110° C., the stirrer speed being 150 r.p.m. and polymerization being continued until the solids content was 25.4% by weight. 1,800 ml of water, containing 9 g of polyvinylpyrrolidone having a K value of 90 and 1.8 g of $Na_4P_2O_7$, were then added, and the stirrer speed was increased to 300 r.p.m. Polymerization was then continued for 3 hours at 110° C., for 3 hours at 120° C. and for 4 hours at 140° C., a styrene conversion of 99% being achieved.

($a_4$) Preparation of an impact-resistant polystyrene having a mean particle size of about 1.5 μm:

A solution comprising 1,283 g of styrene, 112 g of polybutadiene (1,2-vinyl content about 9% by weight), 1.5 g of tert.-dodecylmercaptan, 1.5 g of octadecyl 3-(3',5'-di-tert.-butyl-4'-hydroxyphenyl)-propionate and 1.5 g of dicumyl peroxide was prepolymerized in a 4 liter stirred kettle equipped with a paddle stirrer, the internal temperature being 110° C., the stirrer speed being 150 r.p.m. and polymerization being continued until the solids content was 25.4% by weight. 1,800 ml of water, containing 9 g of polyvinylpyrrolidone having a K value of 90 and 1.8 g of $Na_4P_2O_7$, were then added, and the stirrer speed was increased to 300 r.p.m. Polymerization was continued for 3 hours at 110° C. and for 4 hours at 140° C., a styrene conversion of 99% being achieved.

II. Preparation of the polyphenylene ether (b)

1.3 g of Cu(I) bromide and 33 g of dibutylamine were initially taken, 2 g of 2,6-dimethylphenol were added and the mixture was stirred for 5 minutes at 20° C., while oxygen was passed in. A solution of 204 g of 2,6-dimethylphenol in 1,400 ml of toluene was then metered in over 30 minutes, and stirring was then continued for 1.5 hours at 20° C. 50 liters/hour of oxygen were passed in during the reaction, and after the latter was complete, the polymer was precipitated with 10 liters of methanol and dried. The polymer obtained had an intrinsic viscosity $[\eta]_{0.5}$ of 0.60 dl/g.

III. Preparation of the elastomeric block copolymer (c)

The ethylene copolymers employed as starting materials are products which are prepared by the high pressure process in an autoclave or a tubular polymerization apparatus. The proportions of comonomers, the density and the melt index are listed in the Table.

The polymers used are obtained by anionic polymerization of the monomers in solution.

Preparation of the block copolymer (c) (cf. Table 1)

The active polymer obtained from an anionically polymerized monomer was added, in the amount shown in Table 1, in solution, to the amount of ethylene copolymer shown in the Table (about 10% strength by weight solution), the addition being carried out in the course of 30 minutes, in tne absence of air and moisture, at 75° C. and while stirring vigorously. The active polymer was prepared as a 15% strength by weight solution in toluene. To do this, the monomer or monomers in toluene were initially taken and heated at 40° C., and protic impurities were destroyed by adding a 2.4% strength by weight solution of sec.-butyl-lithium in hexane a little at a time until an increase in temperature indicated the beginning of polymerization. The theoretical amount of sec.-butyl-lithium required to reach the desired molecular weight was then added, and polymerization was carried out for 40 minutes at 50°–60° C.

When the addition was complete, stirring was continued for 30 minutes at 75° C., after which the product was precipitated with ethanol, filtered off under suction, washed twice with ethanol and dried at 60° C. under a reduced pressure of 1 mm Hg. The compositions of block copolymers $C_1$ to $C_7$ are shown in Table 1.

The amounts (parts by weight) of styrene polymers (a), poly(2,6-dimethyl-1,4-phenylene) ethers (b) and elastomeric block copolymers (c) shown in Table 2, together with, in each case, 0.8 part by weight of tris(-nonylphenyl) phosphite and 1.5 parts by weight of a polyethylene wax with a melt viscosity of 1,300 cSt, measured at 120° C., were melted, homogenized, mixed and granulated in a twin-screw extruder at 280° C. The mixtures were converted to test samples at 280° C., using an injection molding machine. The results of the tests are summarized in Table 2.

TABLE 1

| Component c | Ethylene copolymer Comonomer | % by weight | Density g/cm³ | Melt index g/10 min | Parts by weight | Monomer | Degree of polymerization | Parts by weight |
|---|---|---|---|---|---|---|---|---|
| $c_1$ | Methyl methacrylate | 1 | 0.922 | 0.7 | 70 | Styrene | 200 | 30 |
| $c_2$ | n-Butyl acrylate | 4 | 0.926 | 0.3 | 50 | Styrene | 200 | 50 |
| $c_3$ | " | 4 | 0.926 | 0.3 | 50 | Butadiene | 200 | 50 |
| $c_4$ | " | 4 | 0.926 | 0.3 | 60 | Styrene/Butadiene (1:1) | 200 | 40 |
| $c_5$ | " | 18 | 0.925 | 1.8 | 80 |  | 200 | 20 |
| $c_6$ | " | 18 | 0.925 | 1.8 | 70 | Styrene | 200 | 30 |
| $c_7$ | Maleic anhydride | 8 | 0.926 | 2.3 | 70 | Styrene | 200 | 30 |
| $c_8$ | Allyl glycidyl ether | 10 | 0.918 | 9.7 | 70 | Styrene | 200 | 30 |
| $c_9$ | Vinyl chloride | 12 | 0.920 | 14.5 | 70 | Styrene | 200 | 30 |
| $c_{10}$ | Carbon monoxide | 8 | 0.922 | 2.9 | 70 | Styrene | 200 | 30 |
| $c_{11}$ | " | 15 | 0.926 | 1.8 | 70 | Styrene | 200 | 30 |

TABLE 2

| Example | Impact-resistant polystyrene a | [% by weight] | Polyphenylene ether b | [% by weight] | Block copolymer c | [% by weight] | Vicat temperature [°C] | Notched impact strength [K γ/m²] | Energy at break [Nm] | Melt index [/10] |
|---|---|---|---|---|---|---|---|---|---|---|
| 1 | $a_1$ | 50 | b | 40 | $c_1$ | 10 | 131 | 9 | 18 | 78 |
| 2 | $a_2$ $a_3$ | 60 7.5 | b | 22.5 | $c_2$ | 10 | 115 | 15 | 26 | 165 |
| 3 | $a_2$ $a_3$ | 44.5 5.0 | b | 40.5 | $c_6$ | 10 | 130 | 21 | 32 | 50 |
| 4 | $a_4$ | 49.5 | b | 40.5 | $c_3$ | 10 | 125 | 18 | 25 | 47 |
| 5 | $a_2$ $a_3$ | 44.5 5.0 | b | 40.5 | $c_4$ | 10 | 128 | 20 | 32 | 42 |
| 6 | $a_2$ $a_3$ | 44.5 5.0 | b | 40.5 | $c_5$ | 10 | 130 | 18 | 30 | 55 |
| 7 | $a_2$ $a_3$ | 44.5 5.0 | b | 40.5 | $c_7$ | 10 | 131 | 17 | 27 | 38 |
| 8 | $a_2$ $a_3$ | 40.5 | b | 40.5 | $c_2$ | 15 | 130 | 22 | 30 | 48 |
| 9 | $a_2$ $a_3$ | 44.5 5.0 | b | 40.5 | $c_8$ | 10 | 129 | 20 | 21 | 139 |
| 10 | $a_2$ $a_3$ | 44.5 5.0 | b | 40.5 | $c_9$ | 10 | 131 | 19 | 29 | 159 |
| 11 | $a_2$ $a_3$ | 44.5 5.0 | b | 40.5 | $c_{10}$ | 10 | 133 | 23 | 30 | 89 |
| 12 | $a_2$ $a_3$ | 44.5 5.0 | b | 40.5 | $c_{11}$ | 10 | 131 | 22 | 30 | 78 |
| Comparative experiments (not according to the invention) | | | | | | | | | | |
| A | $a_2$ $a_3$ | 66.66 8.33 | b | 25 | — | — | 105 | 9 | 21 | 137 |
| B | $a_2$ | 60 | b | 22.5 | $C_B^+$ | 10 | 104 | 14 | 28 | 123 |

$^+C_B$ is a hydrogenated block copolymer of the ABA type comprising clearly separated styrene blocks A, which together constitute 35% by weight and in each case have a mean molecular weight of 20,000, and a hydrogenated polybutadiene block B.

We claim:

1. A thermoplastic molding material based on
(a) a non-modified styrene polymer, an impact-resistant, rubber modified styrene polymer or mixtures thereof wherein the rubber consists essentially of natural rubber, polybutadiene, polyisoprene, copolymers of butadiene or isoprene with styrene, copolymers of butadiene and isoprene with styrene, acrylate rubbers, ethylene-propylene non-conjugated diene rubbers, polybutylene rubbers or polyoctenamer rubbers,
(b) polyphenylene ethers and
(c) a component which improves the impact strength, wherein component (c) is a block copolymer obtained when a copolymer of ethylene with an acrylate, methacrylate, anhydride, epoxide-containing monomer or carbon monoxide is reacted with an active polymeric anion comprising one or more anionically polymerized monomers, said block copolymer having the formula $(A_n):(B_1)_k(C_m)_j$, where A is $CH_2-CH_2-$, B is an acrylate, methacrylate, an anhydride, epoxide-containing monomer, or carbon monoxide, $C_m$ is obtained from one or more monomers, n and m are each integers greater than 30, 1, i, k and j are each integers greater than or equal to 1, and $k.1 \geq j$.

2. A thermoplastic molding material as claimed in claim 1, wherein component (c) is a block copolymer obtained when a copolymer of ethylene with an acrylate, a methacrylate, maleic anhydride or carbon monoxide is reacted with an active polymeric anion comprising styrene, butadiene, isoprene or a mixture of the polymeric anion.

* * * * *

UNITED STATES PATENT AND TRADEMARK OFFICE
CERTIFICATE OF CORRECTION

PATENT NO. : 4,526,927
DATED : July 2, 1985
INVENTOR(S) : Juergen HAMBRECHT, et al.

It is certified that error appears in the above-identified patent and that said Letters Patent is hereby corrected as shown below:

IN THE COVER SHEET:

[75] Inventor "Müller" should be --Müeller--; and

[56] IN THE REFERENCES CITED:

the U.S. Patent "Ciz" should be --Cizek--.

Signed and Sealed this

Eighth Day of October 1985

[SEAL]

Attest:

Attesting Officer

DONALD J. QUIGG

Commissioner of Patents and
Trademarks—Designate